(12) United States Patent
Shinohara et al.

(10) Patent No.: US 7,048,574 B2
(45) Date of Patent: May 23, 2006

(54) RESILIENT CONTACT STRUCTURE WITH BYPASS WIRE AND CAMERA HAVING SUCH CONTACT

(75) Inventors: Junichi Shinohara, Yokohama (JP); Ikuya Tsurukawa, Yokohama (JP); Akemi Miyoshi, Yokohama (JP); Kouji Yokoyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/863,200

(22) Filed: Jun. 9, 2004

(65) Prior Publication Data

US 2005/0020126 A1    Jan. 27, 2005

(30) Foreign Application Priority Data

Jun. 9, 2003   (JP)   .............................. 2003-163575
Apr. 15, 2004  (JP)   .............................. 2004-119955

(51) Int. Cl.
*H01R 11/20* (2006.01)

(52) U.S. Cl. ........................................ 439/515; 439/700
(58) Field of Classification Search ................ 439/500, 439/515, 700, 824; 429/96–100, 121, 123
See application file for complete search history.

(56) References Cited

U.S. PATENT DOCUMENTS

| | | | | |
|---|---|---|---|---|
| 2,993,948 A | * | 7/1961 | Vaclaw | ........................ 429/96 |
| 3,032,735 A | * | 5/1962 | Dingman | ..................... 439/30 |
| 4,199,209 A | * | 4/1980 | Cherian et al. | ............. 439/591 |
| 4,383,007 A | * | 5/1983 | Murphy | .......................... 429/1 |
| 4,494,854 A | * | 1/1985 | Yamaga et al. | .............. 396/304 |
| 4,712,898 A | * | 12/1987 | Haraguchi | .................... 396/539 |
| 4,904,213 A | * | 2/1990 | Hock et al. | .................. 439/824 |
| 5,259,786 A | * | 11/1993 | Huang | .......................... 439/500 |
| 6,033,233 A | * | 3/2000 | Haseyama et al. | ............. 439/66 |
| 6,194,097 B1 | * | 2/2001 | Nelson et al. | ............... 429/121 |
| 6,712,642 B1 | * | 3/2004 | Bluhm et al. | ................ 439/500 |

FOREIGN PATENT DOCUMENTS

| | | |
|---|---|---|
| JP | 2000-082450 | 3/2000 |
| JP | 2001-305624 | 11/2001 |

OTHER PUBLICATIONS

U.S. Appl. No. 11/068,983, filed Mar. 2, 2005, Yokoyama.

*Primary Examiner*—Neil Abrams
(74) *Attorney, Agent, or Firm*—Oblon, Spivak, McClelland, Maier & Neustadt, P.C.

* cited by examiner (57) ABSTRACT

A contact structure having a spring with electro conductivity. The spring is fixed at one inner end side of a battery housing by engaging a plurality of inflection parts of the spring to one end side of the battery housing. The spring urges the battery to the other end side of a battery housing. An end portion on movable side end of the spring is extended toward an opening on a lateral face of the battery housing. The end portion is formed on a contact side end of the spring that is contacted with the battery, and is connected to one end side of a bypassing lead wire. An end portion on the fixed side end of the spring is connected to the other end side of the bypassing lead wire. The end portion of the fixed side end of the spring is connected to a power source lead wire. A free end of the contact movable side end can be bent away from the battery to provide a solder connection to the bypass wire.

20 Claims, 4 Drawing Sheets

RESILIENT CONTACT STRUCTURE WITH BYPASS WIRE AND CAMERA HAVING SUCH CONTACT

BACKGROUND OF THE INVENTION

1. Field of the Invention

The present invention relates to a contact structure, an apparatus having the contact structure and an image input apparatus having the contact structure. The contact structure can electrically contact to a predetermined connection object stably using a bypassing conductive member with less contact resistance.

2. Description of the Related Art

Apparatuses that are driven by means of a battery are generally known. In particular, such devices include digital cameras, film cameras, compact disk players, radios, wireless remote control transmitters and various communication instruments. These apparatuses have a battery housing arranged to detachably house a battery. The battery housing has a contact terminal member configured to stably hold the battery by facing the electrode of the battery that is housed, and has a resilient contact terminal member configured to urge the battery into the contact terminal member. Therefore, the battery housing can stably supply electricity having substantially the same voltage as the original voltage stably to various units that are included in the apparatus as demanded.

Also, several apparatuses of above-mentioned apparatuses may be powered by electricity supplied from an AC adapter, by means of mounting an AC adapter that is the same shape as the shape of the battery and can supply electricity having the same voltage as the battery supplies.

In Japanese Patent Laid-Open No. 2001-305624, the following camera battery housing device is described. Namely, this camera battery housing device is provided with a plurality of battery loading parts, a short bar, a displacement spring and an urging spring. The plurality of battery loading parts is fixed side by side in a battery magazine arranged so as to be housed in a battery housing. The short bar connects between a positive electrode and a negative electrode to be connected with of a pair of adjacent batteries to be loaded into the battery loading parts with their polarities alternately reversed. The displacement spring displaces the short bar so that the short bar is abutted to a battery support surface of the battery loading parts. The urging spring urges the short bar to the positive and negative electrodes of the pair of the batteries against the displacement force of the displacement spring when the battery magazine is housed within the battery housing.

In Japanese Patent Laid-Open No. 2000-82450, the following dry battery electrode is described. This dry battery electrode holder is provided with a positive electrode part consisting of a moving plate which is vertically movable along a slit, a coil spring for urging the moving plate toward a positive electrode of a first dry cell, and a lead wire. The lower face of the moving plate is provided with a ring insulator, in which a hole is formed at the center where a protruded portion defining the positive electrode of the dry cell enters. At the bottom of the hole, a positive electrode contact piece is formed for contacting the positive electrode. When the dry cell is housed properly in a first cell chamber, said protruded portion enters into the hole in the ring insulator and contacts the positive electrode contact piece at the bottom of the hole, and then the positive electrode of the dry cell is connected to a circuit via the lead wire.

Figure 6:
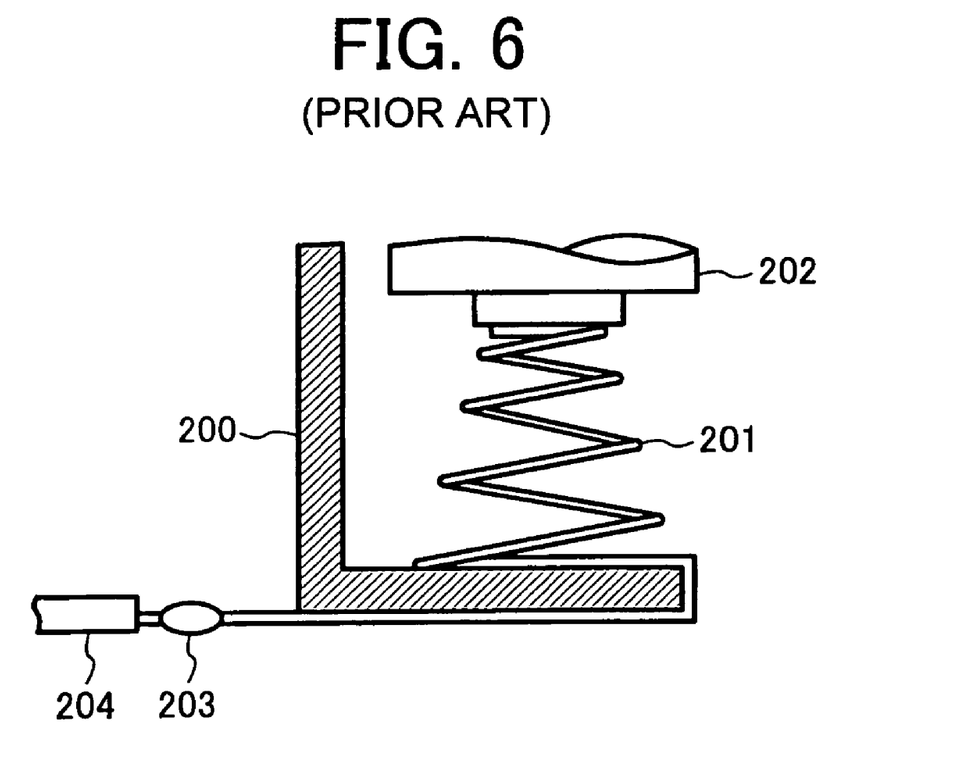
FIG. 6 is a front view of a related art structure.

In other words, the above-mentioned two documents describe a coil spring for generating a spring pressure and a contact terminal member for reducing internal resistance. When the coil is employed, one side of a coil spring 201, as shown on FIG. 6, is fixed on a lateral face of one end side of the battery housing 200, and the battery 202 is urged by the other end side of the coil spring 201 toward the other end side of the battery housing 200. Also, an end portion on one side of a coil spring 201 is connected to a lead wire 204 by solder 203.

However, the structures described in these documents cannot stably supply electricity having substantially the same voltage as the original voltage of the connection object, such as the battery and the AC adapter, so that stable contact pressure cannot be held and cannot reduce contact resistance. Namely, there is a problem that extremely lower voltage than original voltage supplied by the battery is supplied since a length from the contact location between the battery 202 and the contact terminal member to a one of a lead wire extracting location and a soldering location connected with printed circuit board is long, due to the use of the spring as a part of the electric circuit. Also, there is another problem in that the use of a contact structure including both of the spring and a contact terminal member that can reduce internal resistance is more expensive.

SUMMARY OF THE INVENTION

The present invention advantageously provides a contact structure that can decrease useless wiring resistance that is based on the contact terminal member, and can supply electricity having substantially the same voltage as the original voltage of the connection object, by means of effectively applying a bypassing conductive member having high electro conductivity in comparison with the contact terminal member. Also, the present invention advantageously provides a contact structure having stability of supplying electricity by means of supplying electricity from a connection object thru a fixed side of the contact terminal member, even if the bypassing conductive member is disconnected from at least one of the movable side and the fixed side of the contact terminal member.

The present invention includes contact structure supplied with electricity from a connection object, such as a battery or an AC adapter, that includes a contact terminal member, an electricity acquisition member and a bypassing conductive member. A contact terminal member such as a spring has resilience and electro conductivity, and includes a fixed side and a movable side at both ends thereof. The fixed side of the contact terminal member is fixed, and the movable side of the contact terminal member is connected with the connection object and moves by deforming at a predetermined deformation region and urging the connection object. The electricity acquisition member such as a power source lead wire having electro conductivity is connected to the fixed side of the contact terminal member. The bypassing conductive member, such as a bypassing lead wire having both electro conductivity and less electrical resistance than the contact terminal member, is connected between the movable side of the contact terminal member and the fixed side of the contact terminal member.

It is preferable that the bypassing conductive member is connected to a periphery of an end portion on the movable side of the contact terminal member at a periphery of a connecting location between the connection object and the contact terminal member.

It is also preferable that the bypassing conductive member is connected to a periphery of an end portion on the fixed side of the contact terminal member at a periphery of a connecting location between the electricity acquisition member and the contact terminal member.

It is also preferable that the connection object is a battery or an AC adapter terminal. It is also preferable that the connection terminal is coiled spring.

An apparatus having the contact structure of the present invention has a housing and the contact structure. The housing is configured to house the connection object configured to supply electricity for a plurality of units arranged in the apparatus. The contact structure is housed within the housing so that the contact structure is faced to the contact object.

It is acceptable that the apparatus having the contact structure of the present invention further has an opening that is configured to extract at least one of the bypassing conductive member and contact terminal member to outside of the housing. In this case, the opening is formed on a face of the housing at a side where the contact terminal member is arranged.

In the apparatus having the above-mentioned opening, it is preferable that the opening is formed having a predetermined length that the member extracted can be moved at least from one condition, in which the contact terminal member is compressed to a necessary volume, to the other condition in which the contact terminal member is extended normally, along a moving direction thereof.

In the apparatus having the above-mentioned opening, it is preferable that the opening is formed on a lateral face of the housing at the side where the contact terminal member is arranged.

In the apparatus having above-mentioned opening, it is preferable that the movable side of the contact terminal member is bent away from a position opposing the connection object, and the bypassing conductive member is arranged substantially along a peripheral of a medial axis of the contact terminal member.

In the apparatus having the above-mentioned opening, it is preferable that the bypassing conductive member is bent at a location that is not contacted with the housing, when the contact terminal member is extended normally.

An image input apparatus having the contact structure of the present invention has an image capturing unit, an image data storing unit, a housing and the contact structure. The image capturing unit is configured to capture an optical image of a subject and convert the optical image into an image data. The image data storing unit is configured to store image data into a storage memory. The housing is configured to house a connection object that is configured to supply electricity for the image capturing unit and the image data storing unit.

DETAILED DESCRIPTION OF THE PREFERED EMBODYMENT

Referring to the accompanying drawings, a detailed description of the preferred embodiment of the present invention in now provided. The above and further advantages and novel features of the invention will more fully appear from the following detailed description when the same is read in connection with the accompanying drawings. It is to be expressly understood, however, that the drawings are for purpose of illustration only and are not intended as a definition of the limits of the invention.

(First Embodiment)

Figure 1:
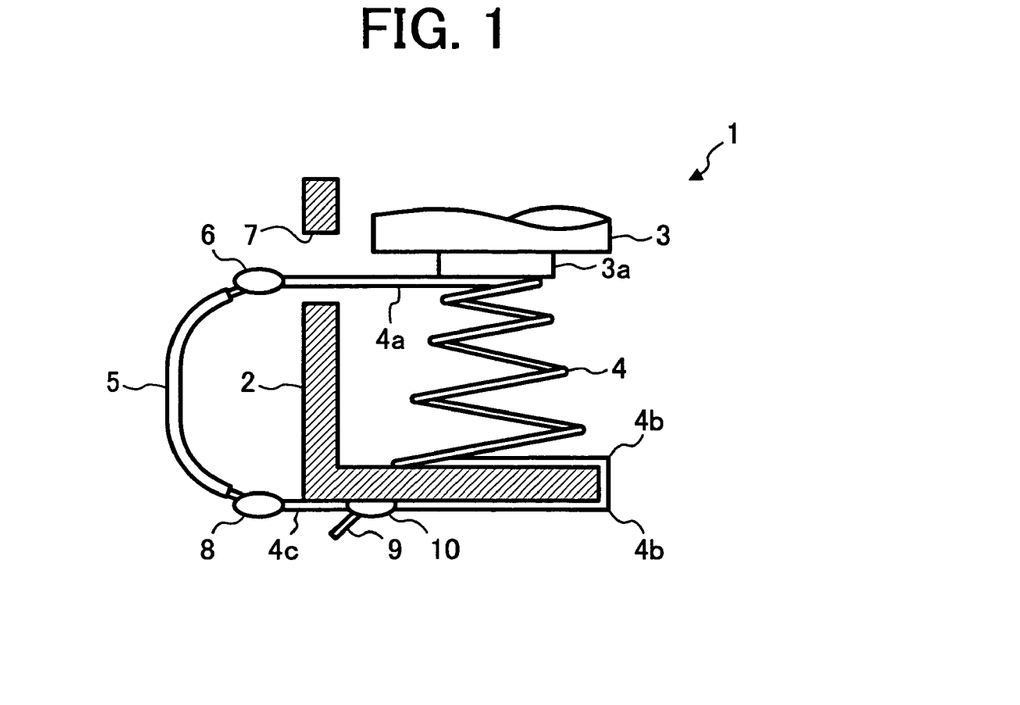
FIG. 1 is a front view of a contact structure 1 applied to an apparatus related to a first embodiment of the present invention.

FIG. 1 is a front view of a contact structure 1 applied to an apparatus related to a first embodiment of the present invention. This contact structure 1 is applied to a battery housing of an image input apparatus such as a digital camera, for instance.

In FIG. 1, the contact structure 1 has a battery housing 2 arranged to house a battery 3 as a predetermined connection object. The battery housing 2 has a spring 4 that is arranged within an inside of one end side of the battery housing 2 as a contact terminal member in order to urge the battery 3 toward another end side within the inside of the battery housing 2. The spring 4 has a movable side end 4a and a fixed side end 4c at either end thereof. The fixed side end 4c of the spring 4 is fixed to one end side of the battery housing 2. The movable side of the spring 4 is configured to contact the battery 3 as the connection object. The movable side end 4a of the spring 4 is extended from a contact location between the movable side of the spring 4 and the battery 3 toward a lateral face of the battery housing 2, and an end portion on the movable side end 4a of the spring 4 is connected to one end side of a bypassing lead wire 5 having conductivity as a bypassing conductive member by a solder 6. The bypassing lead wire 5 has less electrical resistance and is shorter in length than the spring 4.

An opening 7 configured to extract both the bypassing lead wire 5 and the end portion on the movable side end 4a of the spring 4 to outside of the battery housing 2 is formed on a lateral face of the battery housing 2 where the spring 4 is arranged. The opening 7 is formed having predetermined length such that the end portion on the movable side end 4a of the spring 4 can be moved at least from one condition in which the spring 4 is compressed to a necessary volume, to another condition, in which the spring is extended normally, along a moving direction thereof. A plurality of inflection parts 4b is formed at the fixed side of the spring 4 and the fixed side of the spring 4 is fixed at one end of the battery housing 2 so that the plurality of inflection parts 4b is engaged to the battery housing 2. An end portion on the fixed side end 4c of the spring 4 sticks out along one side external wall surface of the battery housing 2 toward a direction that the end portion on the movable side end 4a of the spring 4 is sticks out, and is connected to the other end side of the bypassing lead wire 5 by a solder 8. A periphery of the end portion on the fixed side end 4c of the spring 4 that is connected to the bypassing lead wire 5 is also connected to a power source lead wire 9 as an electricity acquisition member, by a solder 10. The spring 4 is comprised of a member, which has a predetermined electro conductivity and a resilience that has variable suppress strength corresponding to deformation volume thereof. Also, the spring 4 is contacted with a terminal 3a that is one end of the battery 3, and urges the battery 3 toward the other end side of the battery housing 2. Another contact terminal member, not depicted in FIG. 1, is arranged at the other end side of the battery housing 2, and the battery 3 is contacted with another contact terminal member by means of being urged by the spring 4 toward the other end side.

A description is made of the operation of the first embodiment of the present invention. In the first embodiment of the present invention, the battery 3 is connected to the power source lead wire 9 via two paths. A first path is formed from the connecting location between the spring 4 and the terminal 3a of the battery 3, thru the spring 4, and to the connecting location between the spring 4 and the power source lead wire 9. A second path is formed from the connecting location between the spring 4 and the terminal 3a of the battery 3, thru the bypassing lead wire 5 between the solder 6 and the solder 8, and to the connecting location between the spring 4 and the power source lead wire 9. The electricity of the battery 3 is supplied thru the second path, because the bypassing lead wire 5 has lower electrical resistance and shorter length than the spring 4, as above-mentioned. The spring 4 is comprised of a material having predetermined resilience to urge the battery 3, but also may have electrical resistance. In this manner, the contact structure of the first embodiment of the present invention can shorten the length between the terminal 3a of the battery 3 and the power source lead wire 9, and decrease the resistance, by means of connecting the terminal 3a of the battery 3 to the power source lead wire 9, thru the end portion on the movable side end 4a of the spring 4, the bypassing lead wire 5 at the end portion on the fixed side end 4c and part of the spring 4 to the connecting location, in order to supply electricity having a predetermined voltage that is substantially the original voltage of the battery 3 thru the power source lead wire 9. Also these effects of the first embodiment of the present invention are achieved by means of an easy structure that is relatively inexpensive.

The contact structure 1 related to the first embodiment of the present invention also has the end portion on the movable side end 4a of the spring 4 and the bypassing lead wire 5, and at least one of the end portion on the movable side end 4a of the spring 4 and the bypassing lead wire 5 is extends from inside of the battery housing 2 to outside thru the opening 7. The opening 7 is formed having a predetermined length such that at least one of the end portion on the movable side end 4a of the spring 4 and the bypassing lead wire 5 can be moved from one condition in which the spring 4 is compressed to a necessary volume to another condition in which the spring is extended normally, along a moving direction thereof. In this manner, the contact structure 1 of the first embodiment of the present invention prevents stress on the spring 4, the bypassing lead wire 5 and the solder 6, by means of moving smoothly at least one of the end portion on the movable side end 4a of the spring 4 and the bypassing lead wire 5 within the opening 7 during both expansion and contraction of the spring 4, in order to prevent a poor contact between the terminal 3a of the battery 3 and the spring 4, when the battery is inserted into and removed from the battery housing 2.

In the first embodiment of the present invention, the bypassing lead wire 5 is connected to the spring 4 at one location that any portion on the movable side end 4a of the spring 4 and is the connecting location between the terminal 3a of the battery 3 and the spring 4. The bypassing lead wire 5 is also connected to the spring 4 at another location that is any portion on the fixed side end 4c of the spring 4 and is the connecting location between power source lead wire 9 and the spring 4. In this manner, the contact structure 1 of the first embodiment of the present invention can decrease useless wiring resistance that is based on the spring 4, and can supply electricity having substantially the same voltage as the original voltage of the battery 3, by means of effectively applying the bypassing lead wire 5 having high electro conductivity in comparison with the spring 4. Also, the contact structure 1 of the first embodiment of the present invention can improve stability of supplying electricity by means of supplying electricity from the battery 3 thru the fixed terminal side of the spring, even if the bypassing lead wire 5 is disconnected from at least one of the movable side and the fixed side of the spring 4.

(Second Embodiment)

Figure 2:
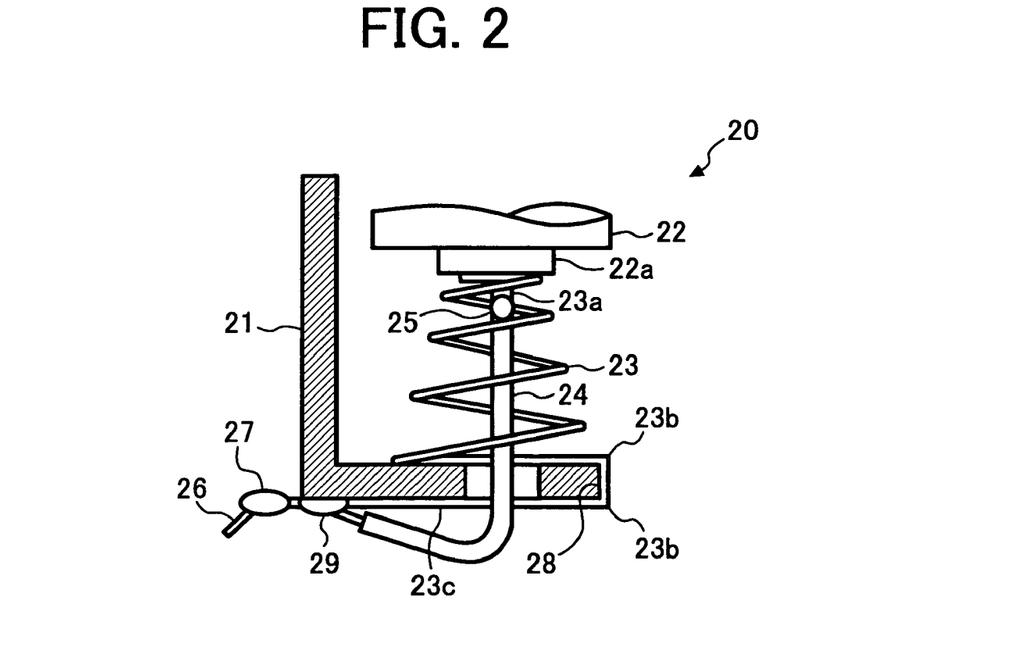
FIG. 2 is a front view of a contact structure 20 applied to an apparatus related to a second embodiment of the present invention.

FIG. 2 is a front view of a contact structure 20 applied to an apparatus related to a second embodiment of the present invention. This contact structure 20 is applied to a battery housing of an image input apparatus such as a digital camera, for instance.

In FIG. 2, a contact structure 20 has a battery housing 21 arranged to house a battery 22 as a connection object. The battery housing 21 has a spring 23 that is arranged in an inner portion of one end side of the battery housing 21 as a contact terminal member in order to urge the battery 22 toward the other end side of the inner portion of the battery housing 21. The spring 23 has a movable side end 23a and a fixed side end 23c at ends thereof. A fixed side end 23c of the spring 23 is fixed to one end side of the battery housing 21. The movable side end 23a of the spring 23 is configured to contact to the battery 22 as the connection object. The movable side end 23a of the spring 23, as a flexural end, is bent away from the direction that the battery 22 is located. The movable side end 23a of the spring 23 is connected to one end side of a bypassing lead wire 24 having conductivity as a bypassing conductive member by a solder 25. The bypassing lead wire 24 has at least one of lower electrical resistance and shorter length than the spring 23. A plurality of inflection parts 23b is formed in the fixed side of the spring 23 and the fixed side of the spring 23 is fixed at one end side of the battery housing 21 so that the plurality of inflection parts 23b is engaged to the battery housing 21.

An end portion on the fixed side end 23c of the spring 23 is formed sticking out toward the lateral face of the battery housing 21 along one side external wall surface of the battery housing 2, and is connected to the other end side of the power source lead wire 26 by a solder 27.

The spring 23, is comprised of a member, which has predetermined electro conductivity and resilience, that has variable suppress strength corresponding to deformation volume thereof. Also, the spring 23 is contacted with a terminal 22a that is one end of the battery 22, and urges the battery 22 toward the other end side of the battery housing 21. Another contact terminal member, not depicted in FIG. 2, is arranged at an inner portion of the other end side of the battery housing 21, and the battery 22 is contacted with another contact terminal member by means of being urged by the spring 23 toward the other end side. An opening 28 configured to allow the bypassing lead 24 to extend outside of the battery housing 21 is formed on a face of the battery housing 21 where the spring 23 is arranged and sustaining the fixed side of the spring 23, and is formed at a periphery of a medial axis of the spring 23.

The bypassing lead wire 24 that is connected to the flexural end 23a of the spring 23 is extends from the inside of the battery housing 21 to the outside thru the medial axis of the spring 23 and the opening 28. The bypassing lead wire 24 that extends from the inside of the battery housing 21 to the outside thru the opening 28 may be bent at the location that is not contacted with the battery housing 21 when the spring 23 is in condition that the spring is extended normally, when necessary. Also, the bypassing lead wire 24 is connected to the spring 23 at the end portion on the fixed side end 23c of the spring 23, and at a periphery of a connecting location between the spring 23 and the power source lead wire 26.

A description is made of the operation of the second embodiment of the present invention. In the second embodiment of the present invention, the battery 22 is connected to the power source lead wire 26 via two paths. A first path is formed from the connecting location between the spring 23 and the terminal 22a of the battery 22, thru the spring 23, and to the connecting location between the spring 23 and the power source lead wire 26. A second path is formed from the connecting location between the spring 23 and the terminal 22a of the battery 22, thru the bypassing lead wire 24 between the solder 25 and the solder 29, and to the connecting location between the spring 23 and the power source lead wire 26. The electricity of the battery 22 is supplied thru the second path, because the bypassing lead wire 24 has at least one of a lower electrical resistance and a shorter length than of the spring 23, as above-mentioned. The spring 23 is comprised of a material having a predetermined resilience to urge the battery 22, but also may have electrical resistance.

In this manner, the contact structure described of the second embodiment of the present invention can shorten the length between the terminal 22a of the battery 22 and the power source lead wire 26, and decrease the resistance, by means of connecting the terminal 22a of the battery 22 to the power source lead wire 26, thru the end portion on the movable side end 23a of the spring 23, the bypassing lead wire 24 and part of the spring 23 (that is from the connecting location between the end portion on the fixed side end 23c of the spring 23 and the bypassing lead wire 24 to the connecting location between the end portion on the fixed side end 23c of the spring 23 and the power source lead wire 26), in order to supply electricity having substantially the same voltage as the original voltage of the battery 22 thru the power source lead wire 26. Also these effects of the second embodiment of the present invention are achieved by means of an easy structure that is relatively inexpensive. In the second embodiment of the present invention, the bypassing lead 24 extends to the outside of the battery housing 21, thru the opening 28 that is formed on a face of the battery housing 21 arranged substantially along a medial axis of the spring 23 and is configured to allow the bypassing lead 24 to extend outside of the battery housing 21.

Also, the bypassing lead wire 24 extending from inside of the battery housing 21 to outside thru the opening 28 is bent at the location that is not contacted with the battery housing 21 when the spring 23 is in condition that the spring is extended normally, when necessary. In this manner, the contact structure 1 of the second embodiment of the present invention can prevent stress on the spring 23, the bypassing lead wire 24 and the solder 25 and 29 that are junctions between the bypassing lead wire 24 and the spring 23, by means of smoothly moving the bypassing lead wire 24 within the opening 28 during both expansion and contraction of the spring 23, in order to prevent a poor contact between the terminal 22a of the battery 22 and the spring 23, when the battery is inserted into and removed from the battery housing 21.

And, the contact structures 1 and 20 of the above-mentioned embodiments of the present invention may be employed in an apparatus having the contact structure such as a digital camera. In this manner, an apparatus having the contact structure 1 or 20 of above-mentioned embodiments of the present invention can overcome the drawback that the battery life is short and can achieve extending battery life.

(Third Embodiment)

Figure 3:
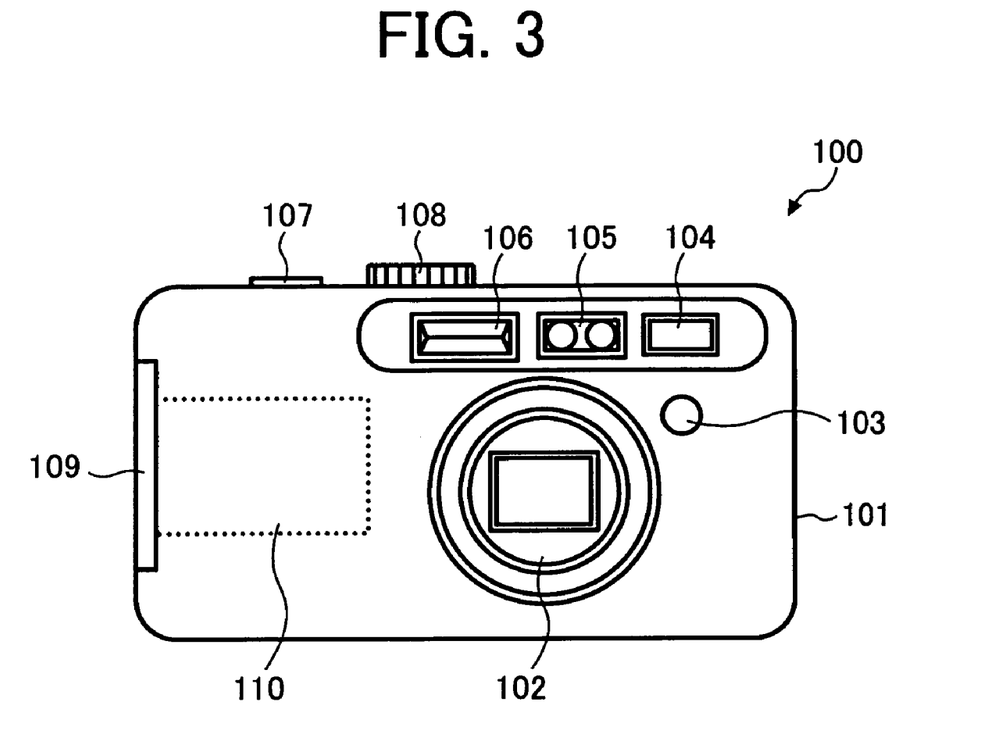
FIG. 3 is an external view of a digital camera 100 related to a third embodiment of the present invention.

FIG. 3 is an external view of a digital camera 100 related to a third embodiment of the present invention. The digital camera 100 has a lens barrel unit 102, a wireless remote control signal receiver 103, an optical finder 104, a range finder 105 and a stroboscope 106 arranged on a front side of the body 101. A shutter release switch 107 and a mode dial 108 are arranged on top of the digital camera 100. And, a card/battery lid 109 is arranged on a lateral face of the digital camera 100.

The lens barrel unit 102 is configured to receive a lens group. The wireless remote control signal receiver unit 103 is configured to receive a signal from a wireless remote control unit operated by a user. The optical finder 104 is configured to view the subject in order to decide a shooting angle. The range finder 105 is configured to measure a distance to the subject. The stroboscope 106 is configured to emit light to light up the subject. The shutter release switch 107 is configured to input a command to shoot a subject. The mode dial 108 is configured to input a command to switch a capturing mode. The card/battery lid 109 is configured to be able to open or close when a memory card or battery arranged into the digital camera is swapped. The battery housing 110 arranged in the body 101 of the digital camera 100 is configured to house a battery, and an external opening of the battery housing 110 is closed with the card/battery lid 109, in order to prevent the battery from dropping out of the battery housing 110.

Figure 4:
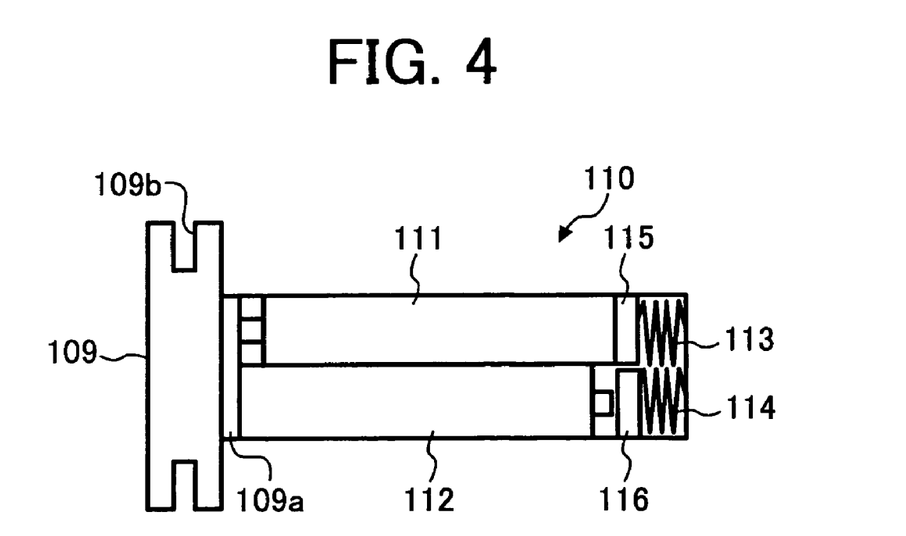
FIG. 4 is a sectional view of a battery housing 110 arranged in a body 101 of the digital camera 100 related to a third embodiment of the present invention.

FIG. 4 is a sectional view of a battery housing 110 arranged in a body 101 of the digital camera 100 related to a third embodiment of the present invention. The battery housing 110 houses two batteries 111 and 112. It is not shown in FIG. 4, however, a memory card housing configured to house a memory card such as an SD card is arranged within the body 101 of the digital camera 100, at a periphery of the battery housing 110, and an external opening of the memory card housing is also closed with the card/battery lid 109.

The card/battery lid 109 includes a segment 109a and a groove 109b. The segment 109a of the card/battery lid 109 is arranged on an inside surface that is facing the inside of the battery housing 110. The groove 109b is arranged on a side surface of the card/battery lid 109, and is configured to engage to a protruding portion (not shown in FIG. 4) arranged on the body 101. Springs 113 and 114 are arranged on a face that is inside of the battery housing 110, facing toward the card/battery lid 109 and corresponding to the batteries 111 and 112. Battery segments 115 and 116 are comprised of the contact structure related to the first and the second embodiments of the present invention, and are arranged on one side of the springs 113 and 114 that is facing to the card/battery lid 109. In this manner, the batteries 111 and 112 are housed within the battery housing 110 by sliding the card/battery lid 109 toward the front side of the digital camera 100 along the groove 109b, in order to open the battery housing 110. A user can swap the memory card so that the memory card housing is also opened by means of above-mentioned sliding.

Otherwise, the opening of both the memory card housing and the battery housing 110 are closed with the card/battery lid 109, by means of both sliding the card/battery lid 109 and fixing the card/battery lid 109 to the battery housing 110 by engaging the groove 109b to the protruding portion of the body 101. When the batteries 111 and 112 are housed in the battery housing 110, the battery segments 115 and 116 urged by the springs 113 and 114 are contacted with the batteries 111 and 112 by pressure, and the batteries 111 and 112 are contacted with the segment 109a of the card/battery lid 109.

Figure 5:
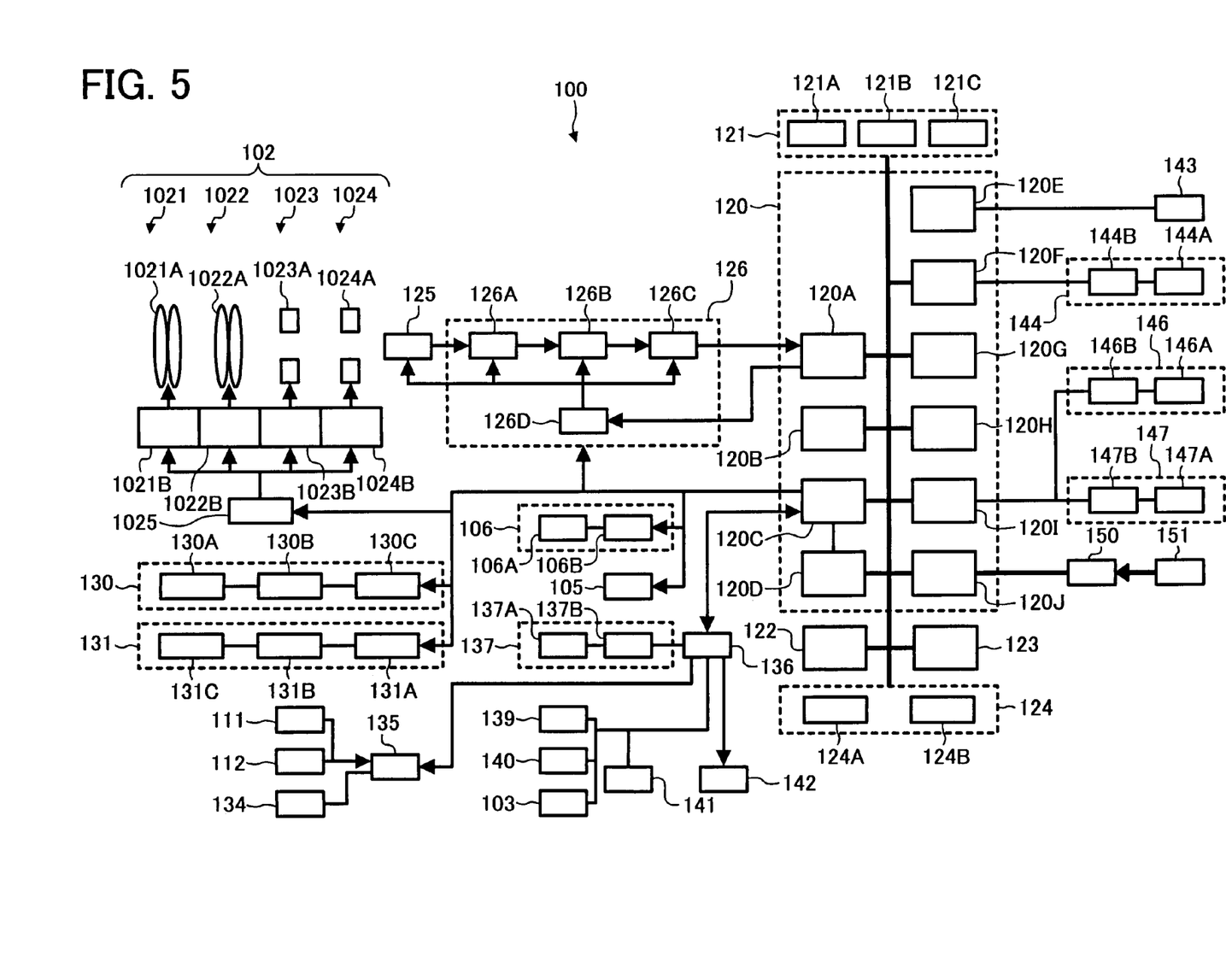
FIG. 5 is a block diagram of the digital camera 100 related to a third embodiment of the present invention.

FIG. 5 is a block diagram of the digital camera 100 related to the third embodiment of the present invention. The digital camera 100 comprises the stroboscope 106, the range finder 105, the wireless remote control signal receiver 103, a lens barrel unit 102, a sub-display unit 137, a AF indication LED 139, a stroboscope indication LED 140, a display unit 146, a operation key unit 141, a front end IC 126, a SDRAM 121, a digital camera processor 120, a RAM 122, a ROM 124, a second CPU 136, a buzzer 142, an audio recording unit 130, an audio playback unit 131, a video output unit 147, a built-in nonvolatile memory 123, a card slot 150, an USB interface 143, a serial communicating unit 144, a power supply circuit 135, and batteries 111 and 112.

The stroboscope 106 is configured to emit light to light up the subject, and comprises a stroboscope emitting part 106A and a stroboscope circuit 106B configured to control charging and emission of light of the stroboscope emitting part 106A. The sub-display unit 137 further comprises a LCD display monitor 137A and a LCD driver 137B comprising a driving circuit to drive the LCD display monitor 137A. The AF indication LED 139 is configured to emit light for indicating AF information such as focus condition during processing of auto focusing. The stroboscope indication LED 140 is configured to emit light for indicating charging information such as charging condition during charging the stroboscope. The lens barrel unit 102 comprises a zooming optical system 1021, a focusing optical system 1022, a diaphragm unit 1023, a mechanical shutter unit 1024 and a motor driver 1025. The zooming optical system 1021 further comprises a zooming lens 1021A configured to capture an optical image of the subject and a zooming drive motor 1021B configured to drive the zooming lens 1021A. The focusing optical system 1022 further comprises a focusing lens 1022A configured to focus to the subject and a focus driving motor 1022B configured to drive the focusing lens 1022A. The diaphragm unit 1023 further comprises a diaphragm 1023A and a diaphragm motor 1023B configured to drive the diaphragm 1023A. The mechanical shutter unit 1024 further comprises a mechanical shutter 1024A and a mechanical shutter motor 1024B configured to drive the mechanical shutter 1024A. The motor driver 1025 is configured to be controlled by a driving instruction from a CPU block 120C included in a digital camera processor 120 described below, based on a input from the wireless remote control signal receiver 103 or the operation key unit 141. The display unit 146 further comprises a LCD display monitor 146A and a LCD driver 146B comprising a driving circuit to drive the LCD display monitor 146A. The front end IC 126 further comprises a CDS 126A, an AGC 126B, an A/D converter 126C and a timing generator 126D. The CDS 126A is configured to process Correlated Double Sampling in order to remove noise of an image. The AGC 126B is configured to process Gain Control. The A/D converter 126C is configured to convert an analog signal into a digital signal. The timing generator 126D is configured to generate a drive timing signal for the CDS 126A, the AGC 126B, the A/D converter 126C and a CCD125. The SDRAM 121 is configured to store an image data temporarily when the image data is given various effects at a digital camera processor 120. The digital camera processor 120 further comprises a CCD1 control block 120A, a CCD2 control block 120B, a CPU block 120C, a local SRAM 120D, an USB block 120E, a serial communicating block 120F, a JPEG codec block 120G, a resizing block 120H, a TV signal indicating block 1201 and a memory card block 120J. The CCD1 control block 120A is configured to apply a white balance correction and a gamma correction to an image data that is output from the front end IC 126 and transmit both a vertically synchronizing signal and a horizontally synchronizing signal to the front end IC 126. The CCD2 control block 120B is configured to convert an image data into a brightness data and a color-fixer data by means of filtering technology. The CPU block 120C is configured to control various functions, (i.e., such as the motor driver 1025, the audio recording unit 130, the audio playback unit 131, the stroboscope 106 and the range finder 105), of the digital camera 100, in accordance with a control program 124A loaded from a ROM 124, after the digital camera is turned on. The local SRAM 120D is configured to temporarily store various data that is necessary for above-mentioned control. The USB block 120E is configured to control communication with an external apparatus such as a personal computer via a USB cable. The serial communicating block 120F is configured to control serial communication with the external apparatus such as a personal computer. The JPEG codec block 120G is configured to process JPEG compression and decompression. The resizing block 120H is configured to enlarge and reduce scale of the image data by data interpolation. The TV signal indicating block 1201 is configured to convert the image data into a video signal for displaying on the display unit 146 and an external display apparatus such as a television. The memory card block 120J is configured to control a memory card 151 for storing the image data shot. The RAM 122 is configured to temporarily store various data that is necessary for total control. The ROM 124 is configured to keep the control programs 124A and various control parameters 124B. The control programs 108a is described by a predetermined code that is readable by the CPU block 120C. The second CPU 136 comprises one-chip element including ROM and RAM, configured to transmit output signals from the operation key unit 141 and the wireless remote control signal receiver 103 to the CPU block 120C, output control signals to the sub-display unit 137, the AF indication LED 139, the stroboscope indication LED 140 and the buzzer 142, after converting a signal output from the CPU block 120C. The audio recording unit 130 further comprises a microphone 130A, a microphone amplifier 130B and an audio recording circuit 130C. The microphone 130A is configured to receive an audio signal in accordance with a command input by a user. The microphone amplifier 130B is configured to amplify an audio signal that is input from the microphone 130A. The audio recording circuit 130C is configured to control recording the audio signal amplified. The audio playback unit 131 further comprises an audio playback circuit 131A, an audio amplifier 131I and a loudspeaker 131C. The audio playback circuit 131A is configured to convert the audio signal that is recorded, into a signal that a loudspeaker 131C can output. The audio amplifier 131B is configured to amplify the audio signal converted, to drive a loudspeaker 131C. The loudspeaker 131C is configured to output the audio signal amplified. The video output unit 147 further comprises a video amplifier 147A and a video interface 147B. The video amplifier 147A comprises an amplifier configured to process 75-omega impedance conversion converting the video signal transmitted from the TV signal indicating block 120I. The video interface 147B comprises an interface configured to connect to the external display apparatus such as the television. The built-in nonvolatile memory 123 is configured to be able to store the image data that is shot, even if the memory card 151 is not housed in a card slot 150 described below, as storage media. The card slot 150 is configured to detachably house the memory card 151. The USB interface 143 comprises an interface configured to connect to the external apparatus, such as the personal computer, in order to communicate various sorts of information via USB cable. The serial communicating unit 144 further comprises a RS-232C interface 144A and a serial communicating driver circuit 144B. The RS-232C interface 144A comprises an interface configured to connect to the external apparatus such as the personal computer in order to communicate various sorts of information serially. The serial communicating driver circuit 144B comprises a converter circuit configured to convert an output signal transmitted from the serial communicating block 120F by transducing voltage.

The power supply circuit 135 is connected to the second CPU 136. The power supply circuit 135 is comprised of a reset circuit configured to order a reset operation to the second CPU 136 and a voltage translate circuit for supplying electricity having predetermined voltage that is based on voltage of the batteries 111 and 112 or an AC adapter 134 connected to the power supply circuit 135 when necessary. In addition, detailed descriptions about the reset circuit and the voltage translate circuit are omitted so that the reset circuit and the voltage translate circuit is general circuit. Also, it is acceptable that a reset IC on the market is employed instead of the reset circuit.

When the batteries 111 and 112 or the AC adapter 134 is mounted to the digital camera 100, the power supply circuit 135 is supplied with electricity from the batteries 111 and 112 or the AC adapter 134. After that, the power supply circuit 135 resets the second CPU 136. The digital camera processor 120 controls operation of the digital camera 100 generally, after the second CPU 136 is run by means of the resetting. The second CPU 136 communicates serially with the CPU block 1201 of the digital camera processor 120 at predetermined intervals, and controls the power supply circuit 135 to supply electricity for various units that need electricity, in accordance with an order from the CPU block 120.

In addition, though the AC adapter 134 of the digital camera 100 related to the third embodiment of the present invention is arranged outside of the digital camera 100 and supplies electricity thru a different circuit, it is acceptable that the AC adapter 134 is housed within the battery housing 110 and supplies electricity for various units by means of the same circuit that is used for the battery. Namely, it is acceptable that a shape of a terminal that is faced to the digital camera 100, of the AC adapter 134, is formed the same as the shape of the terminal of the batteries 111 and 112, and a shape of a terminal that is connected to the segment 109a, of the AC adapter 134, is also formed the same as the shape of the terminal of the batteries 111 and 112. In this case, a part of the AC adapter 134 that is housed within the digital camera 100 may have a power supply circuit for converting AC power supply into DC power supply and for supplying electricity having the same voltage as the batteries 111 and 112 have. Also, the hole configured to connect the part of the AC adapter 134 to AC receptacle may be formed on the card/battery lid 109. In this manner, the digital camera 100 can omit having a special terminal that is only used for the AC adapter 134.

In addition, though the third embodiment is mentioned about the digital camera 100 having the contact structure related to the first and the second embodiment of the present invention, the apparatus having the contact structure includes all of portable apparatuses having the contact structure of the present invention; all of portable apparatuses include such as a film camera, a compact disk player, radio, a wireless remote control transmitter and communication instrument. The predetermined connection object is not only limited to the battery, but also includes the AC adapter having a battery shape terminal.

The present invention claims priority to Japanese Patent Publication JP 2003-163575 filed in Japan on Jun. 9, 2003, and Japanese Patent Publication JP 2004-119955 filed in Japan on Apr. 15, 2004, both of which are incorporated herein by reference in their entirety.

What is claimed is:

1. An apparatus having a contact structure comprising:
a housing configured to house a connection object configured to supply electricity for plurality of units arranged in said apparatus;
a contact terminal member having resilience and electro conductivity including a fixed side and a movable side, said fixed side of said contact terminal member is fixed on said housing, said movable side of said contact terminal member is connected with said connection object by deforming within a predetermined deformation region and urging said connection object;
an electricity acquisition member connected to said fixed side of said contact terminal member, said electricity acquisition member having electro conductivity;
a bypassing conductive member connecting said movable side of said contact terminal member with said fixed side of said contact terminal member, said bypassing conductive member having electro conductivity and less electrical resistance than said contact terminal member; and
an opening configured to allow either said bypassing conductive member or said contact terminal member to extend outside of said housing,
wherein said opening is formed on a lateral face of said housing at the side where said contact terminal member is arranged, said lateral face being directly opposed to an axis of compression of said contact terminal member.

2. An apparatus having a contact structure according to claim 1, wherein said bypassing conductive member is connected to a periphery of an end portion on said movable side of said contact terminal member at a periphery of a connecting location between said connection object and said contact terminal member.

3. An apparatus having a contact structure according to claim 1, wherein said bypassing conductive member is connected to a periphery of an end portion on said fixed side of said contact terminal member at a periphery of a connecting location between said electricity acquisition member and said contact terminal member.

4. An apparatus having a contact structure according to claim 1, wherein said movable side of said contact terminal member is configured to connect with a battery as said connection object.

5. An apparatus having a contact structure according to claim 1, wherein said movable side of said contact terminal member is configured to connect an AC adapter terminal as said connection object.

6. An apparatus having a contact structure according to claim 1, wherein said contact terminal member is a coiled spring.

7. An apparatus having a contact structure comprising:
- a housing configured to house a connection object configured to supply electricity for plurality of units arranged in said apparatus;
- a contact terminal member having resilience and electro conductivity including a fixed side and a movable side, said fixed side of said contact terminal member is fixed on said housing, said movable side of said contact terminal member is connected with said connection object by deforming within a predetermined deformation region and urging said connection object;
- an electricity acquisition member connected to said fixed side of said contact terminal member, said electricity acquisition member having electro conductivity;
- a bypassing conductive member connecting said movable side of said contact terminal member with said fixed side of said contact terminal member, said bypassing conductive member having electro conductivity and less electrical resistance than said contact terminal member; and
- an opening configured to allow either said bypassing conductive member or said contact terminal member to extend outside of said housing, said opening is formed on a face of said housing at a side where said contact terminal member is arranged,
- wherein said opening is formed on a lateral face of said housing at the side where said contact terminal member is arranged, and
- wherein said opening is formed having a predetermined length such that said bypassing conductive member or said contact terminal member extending from said opening can be moved at least from one condition in which said contact terminal member is compressed to a necessary volume to another condition in which said contact terminal member is extended normally, along a moving direction thereof.

8. An apparatus having a contact structure comprising:
- a housing configured to house a connection object configured to supply electricity for plurality of units arranged in said apparatus;
- a contact terminal member having resilience and electro conductivity including a fixed side and a movable side, said fixed side of said contact terminal member is fixed on said housing, said movable side of said contact terminal member is connected with said connection object by deforming within a predetermined deformation region and urging said connection object;
- an electricity acquisition member connected to said fixed side of said contact terminal member, said electricity acquisition member having electro conductivity;
- a bypassing conductive member connecting said movable side of said contact terminal member with said fixed side of said contact terminal member, said bypassing conductive member having electro conductivity and less electrical resistance than said contact terminal member; and
- an opening configured to allow either said bypassing conductive member or said contact terminal member to extend outside of said housing, said opening is formed on a face of said housing at a side where said contact terminal member is arranged,
- wherein:
- a free end section of said movable side of said contact terminal member is bent away from said connection object and said bypassing conductive member is fixed to said free end bent away section; and
- said bypassing conductive member is arranged substantially along a medial axis of said contact terminal member.

9. An apparatus having a contact structure according to claim 8, wherein said bypassing conductive member is bent at a location that is not contacted with said housing when said contact terminal member is in condition that said contact terminal member is extended normally.

10. An image input apparatus having a contact structure comprising:
- an image capturing unit configured to capture an optical image of a subject and convert said optical image into an image data;
- an image data storing unit configured to store image data into a storage memory;
- a housing configured to house a connection object configured to supply electricity for said image capturing unit and said image data storing unit;
- a contact terminal member having resilience and electro conductivity including a fixed side and a movable side, said fixed side of said contact terminal member is fixed on said housing, said movable side of said contact terminal member is connected with said connection object by deforming within a predetermined deformation region and urging said connection object;
- an electricity acquisition member connected to said fixed side of said contact terminal member, said electricity acquisition member having electro conductivity;
- a bypassing conductive member connecting said movable side of said contact terminal member with said fixed side of said contact terminal member, said bypassing conductive member having electro conductivity and less electrical resistance than said contact terminal member; and
- an opening configured to allow either said bypassing conductive member or said contact terminal member to extend outside of said housing
- wherein said opening is formed on a lateral face of said housing at the side where said contact terminal member is arranged, said lateral face being directly opposed to an axis of compression of said contact terminal member.

11. An apparatus having a contact structure comprising:
- a housing means configured to house a connection object configured to supply electricity for plurality of units arranged in said apparatus;
- a contact terminal means having resilience and electro conductivity including a fixed side and a movable side, said fixed side of said contact terminal means is fixed on said housing means, said movable side of said contact terminal means is connected with said connection object by means of deforming within a predetermined deformation region and urging said connection object;
- an electricity acquisition means connected to said fixed side of said contact terminal means, said electricity acquisitions means having electro conductivity;
- a bypassing conductive means for connecting said movable side of said contact terminal means with said fixed side of said contact terminal means, said bypassing conductive means having electro conductivity and less electrical resistance than said contact terminal means; and
- an opening configured to allow either said bypassing conductive means or said contact terminal means to extend outside of said housing means, said opening is formed on a face of said housing means at a side where said contact terminal means is arranged, wherein said opening is formed on a lateral face of said housing means at the side where said contact terminal means is arranged, and wherein said opening is formed having a predetermined length that said bypassing conductive means or said contact terminal means extending from said opening can be moved at least from one condition in which said contact terminal means is compressed to a necessary volume to another condition in which said contact terminal means is extended normally, along a moving direction thereof.

12. An apparatus having a contact structure comprising:
a housing means configured to house a connection object configured to supply electricity for plurality of units arranged in said apparatus;
a contact terminal means having resilience and electro conductivity including a fixed side and a movable side, said fixed side of said contact terminal means is fixed on said housing means, said movable side of said contact terminal means is connected with said connection object by means of deforming within a predetermined deformation region and urging said connection object;
an electricity acquisition means connected to said fixed side of said contact terminal means, said electricity acquisitions means having electro conductivity;
a bypassing conductive means for connecting said movable side of said contact terminal means with said fixed side of said contact terminal means, said bypassing conductive means having electro conductivity and less electrical resistance than said contact terminal means; and
an opening configured to allow either said bypassing conductive means or said contact terminal means to extend outside of said housing means
wherein said opening is formed on a lateral face of said housing means at the side where said contact terminal means is arranged, said lateral face being directly opposed to an axis of compression of said contact terminal means.

13. An apparatus having contact structure according to claim 12, wherein said bypassing conductive means is connected to a periphery of an end portion on said movable side of said contact terminal means at a periphery of a connecting location between said connection object and said contact terminal means.

14. An apparatus having contact structure according to claim 12, wherein said bypassing conductive means is connected to a periphery of an end portion on said fixed side of said contact terminal means at a periphery of a connecting location between said electricity acquisition means and said contact terminal means.

15. An apparatus having contact structure according to claim 12, wherein said movable side of said contact terminal means is configured to connect with a battery.

16. An apparatus having contact structure according to claim 12, wherein said movable side of said contact terminal means is configured to connect with an AC adapter terminal.

17. An apparatus having contact structure according to claim 12, wherein said connection means is a coiled spring.

18. An apparatus having a contact structure comprising:
a housing means configured to house a connection object configured to supply electricity for plurality of units arranged in said apparatus;
a contact terminal means having resilience and electro conductivity including a fixed side and a movable side, said fixed side of said contact terminal means is fixed on said housing means, said movable side of said contact tenninal means is connected with said connection object by means of deforming within a predetermined deformation region and urging said connection object;
an electricity acquisition means connected to said fixed side of said contact terminal means, said electricity acquisitions means having electro conductivity;
a bypassing conductive means for connecting said movable side of said contact terminal means with said fixed side of said contact terminal means, said bypassing conductive means having electro conductivity and less electrical resistance than said contact terminal means; and
an opening configured to allow either said bypassing conductive means or said contact terminal means to extend outside of said housing means, said opening is formed on a face of said housing means at a side where said contact terminal means is arranged,
wherein:
said movable side of said contact terminal means is bent away from said connection object; and
a free end section of said movable side of said contact tenninal means is bent away from said connection object and said bypassing conductive means is fixed to said free end bent away section; and
said bypassing conductive means is arranged substantially along a medial axis of said contact terminal means.

19. An apparatus having a contact structure according to claim 18, wherein said bypassing conductive means is bent at a location that is not contacted with said housing means when said contact terminal means is in condition that said contact terminal means is extended normally.

20. An image input apparatus having a contact structure comprising:
an image capturing means configured to capture an optical image of a subject and convert said optical image into an image data;
an image data storing means configured to store image data into a storage memory;
a housing means configured to house a connection object configured to supply electricity for said image capturing means and said image data storing means;
a contact terminal means having resilience and electro conductivity including a fixed side and a movable side, said fixed side of said contact terminal means is fixed to said housing means, said movable side of said contact terminal means is connected with said connection object by means of deforming within a predetermined deformation region and urging said connection object;
an electricity acquisition means connected to said fixed side of said contact terminal means, said electricity acquisition means having electro conductivity;
a bypassing conductive means connecting said movable side of said contact terminal means with said fixed side of said contact terminal means, said bypassing conductive means having electro conductivity and less electrical resistance than said contact terminal means; and
an opening configured to allow either said bypassing conductive means or said contact terminal means to extend outside of said housing means
wherein said opening is formed on a lateral face of said housing means at the side where said contact terminal means is arranged, said lateral face being directly opposed to an axis of compression of said contact terminal means.

* * * * *